Figure 1:
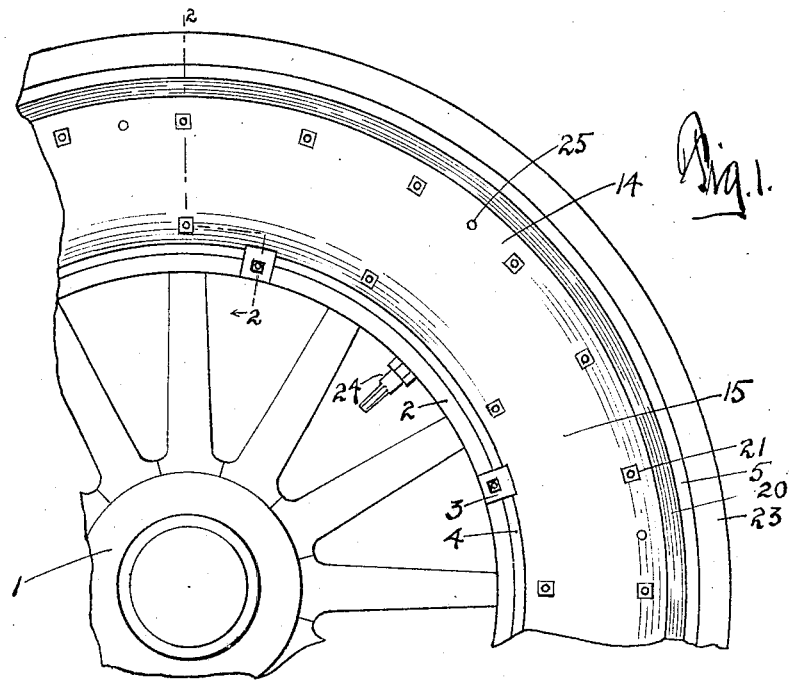

C. DROUET.
PNEUMATIC TIRE.
APPLICATION FILED APR. 4, 1919.

1,346,945.

Patented July 20, 1920.

CHARLES DROUET, Inventor

By Jesse R. Stone

Attorney

UNITED STATES PATENT OFFICE.

CHARLES DROUET, OF HOUSTON, TEXAS.

PNEUMATIC TIRE.

1,346,945. Specification of Letters Patent. Patented July 20, 1920.

Application filed April 4, 1919. Serial No. 287,439.

*To all whom it may concern:*

Be it known that I, CHARLES DROUET, a citizen of the United States, residing at Houston, Harris county, Texas, have invented a certain new and useful Improvement in Pneumatic Tires, of which the following is a full, clear, and exact description, such as will enable others skilled in the art to which it appertains to make and use the same.

My invention relates to an improvement in tires for vehicles but has particular application to tires having the provision of a pneumatic cushion adapted to take up the shocks of travel.

An object of my invention is to provide a tire wherein a pneumatic cushion is secured without the use of the usual rubber or fabric casing now in common use.

Another object is to provide a wheel for vehicles wherein the tire is of rigid material and is separated from the rim of the wheel by an inclosed air cushion adapted to take up the shocks upon the tire.

Another object is to provide a means of adjustably inclosing the air space between a rigid inner rim and a rigid outer rim on a vehicle wheel in such a way that a pneumatic cushion effect is obtained.

Further objects and advantages will be seen in the description which follows, and will be set forth with more particularity in the claims.

Figures 2, 3:
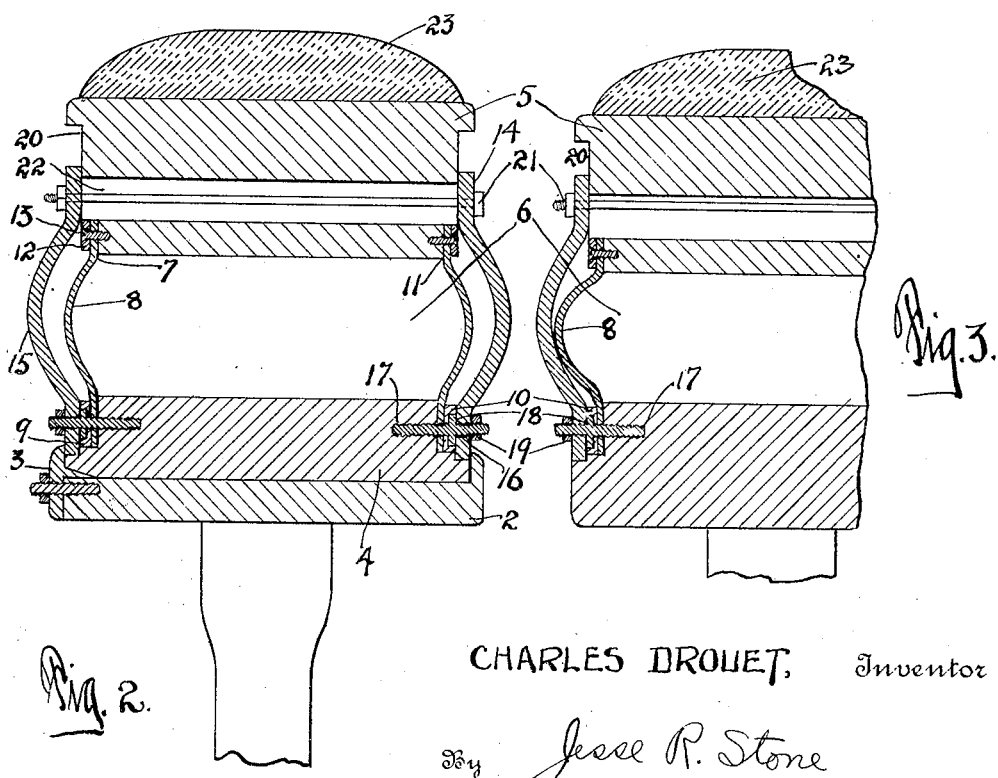

Referring to the drawing forming a part of this specification, and wherein like characters of reference are applied to like parts throughout the several views;

Figure 1 is a broken side view of a wheel provided with my invention; Fig. 2 is a transverse section of the inner and outer rims of said wheel taken on the line 2—2 of Fig. 1; Fig. 3 is a similar view, partly broken illustrating a slightly different embodiment of my invention and also showing a different position of the rims relative to each other.

In the practice of my invention I contemplate the use of a wheel of ordinary template construction having a rigid outer rim. This rim may be the usual rim to which a detachable supplementary rim is secured, as shown in Fig. 2, or may have a special rim to which my invention may be secured directly as shown in Fig. 3.

In the preferred form shown in Figs. 1 and 2, the wheel 1 has a rim 2 of wood, metal, or other rigid material. To the said rim is detachably secured by clamps 3 the special rim 4 also of rigid, somewhat resilient material. Spaced outside the rim 4 is an outer rim 5, also of any well known rigid material, such as wood or metal. Between this rim 5 and the rim 4 is thus provided an air space 6, which I have arranged to inclose so as to provide a pneumatic cushion. This is done by means of annular diaphragms 7 on each side of the wheel, said diaphragms being secured on one edge to the rim 4 and on the other to the rim 5. The said diaphragms may be of resilient metal or of any similar substance having sufficient flexibility and elasticity to allow the pneumatic cushion to take up the shock produced in travel upon the outer rim. It is preferably bowed somewhat intermediate the tire and the rim as shown at 8.

The outer margin of the rim 4 is provided with annular grooves 9 for attachment of the diaphragms 8 thereto. Each groove 9 is of sufficient depth to also accommodate a packing ring 10 outside the diaphragm for the purpose of making an airtight connection between the rim and the diaphragm. The outer edge of the diaphragm 7 is also secured in an annular groove 11 on the inner margin of the rim 5. A packing ring 12 of compressible material is provided outside the diaphragm to retain the diaphragm in airtight connection with the outer rim. The said packing ring 12 and diaphragm 7 are secured firmly to the rim 4 by means of spaced screws 11,— the heads of said screws being counter sunk in the packing ring 12 so that the same will come flush with the outer surface thereof. The diaphragms 7 are protected by outer plates 14 which are bowed at 15 to provide a space for the expansion of the diaphragm 7 as will be explained later. The plates 14 are secured to the inner rim of the wheel so as to press securely against the outer face of the packing rings 10. It is contemplated that the plate 14, the packing 10, and the diaphragm 7 may be secured to the rim 4 by any well known means, but I have shown in the drawing a means which I have found well adapted for that purpose. I have used a double ended stud-bolt or screw 16. Each screw is provided with an inner threaded end 17 and a central head 18, which, when the screw 17 is threaded within the rim, as shown, will find a seat within a counter sunk recess in the outer face of the packing ring 10. The outer end of the stud-bolt is also threaded and the plate 14 has spaced openings to receive the said outer ends and when the plates have been adjusted in position upon the bolts, outer nuts 19 are threaded upon the outer end of the said bolts, thus securing the plates upon the rim.

The outer edges of the plates 14 are arranged to slide upon the side faces of the rim 5, said rim being recessed at 20 to provide sufficient space for this sliding movement. The two opposite plates 14 are connected with each other by means of transverse bolts 21, passing through openings in the outer margins of the plates and through large transverse openings 22 in the outer rim. The outer face of the rim 5 is preferably provided with a solid rubber tread portion 23 to secure a noiseless rolling contact with the road surface. When the diaphragms 7 are secured firmly in position as described, they will serve to inclose in air-tight relation the annular space 6, previously described. The diaphragms 7 are made of strong material so as to withstand a heavy air-pressure. I have provided a valve controlled air-inlet 24 through which air may be pumped into the space 6 until a high pressure is secured. This air cushion will serve to hold the rims spaced evenly apart on all sides and will serve to take up the shock of traffic.

In their normal positions the bolts 21 connecting the outer margins of the plates are placed centrally of the openings 22 in the rim 5 but when a shock is received upon the outer surface of the tire due to contact with some inequality in the road surface, the rim 5 will be forced inwardly at the lower side and outwardly at the upper side relative to the inner rim of the wheel, and the plates 14 will slide on the faces of the rim 5 bringing the bolts 21 on the lower part of the said rim toward the outer face thereof, as shown in Fig. 3. The movement of the rim 5 toward the rim 4 at this point will serve to force the diaphragm 7 outwardly and if the shock is sufficiently strong may force the diaphragm against the plate 14 as shown in Fig. 3. Attention is called to the fact that the diaphragm 8 does not in fact act as a support for the outer tire but the actual support is maintained by the air cushion filling the space 6. The diphragm 7 merely incloses the air in the space between the rims and the resiliency of the diaphragm allows the transmission of the shock to be received equally on all portions of the inclosed cushion. The diaphragm is bowed at 8, not only to allow its ready expansion outwardly, but also to allow the same to be drawn inwardly when the upper part of the tire is forced away from the rim by a shock upon the lower face of the wheel.

A wheel of this construction will be found to be practically puncture proof from the fact that the outer rim is of rigid material and the inclosure for the air space is such that it is protected at all times against wear. It is also obvious that the plates 14 furnish a lateral support to the outer rim and serve to retain the parts in operative position when the wheel is in use. Should, however, a leak occur in such way as to remove the cushion of air between the rims I have provided a means of securing the outer rim in its proper position spaced uniformly from the inner rim 4. In order to accomplish this I have constructed openings 25 at spaced intervals around the outer edge of the plates 14, these openings being arranged in registered position with similar transverse openings through the rim 5. These openings are similar to the openings 22, but of small diameter so that bolts being inserted therein will fit tightly in said openings and nuts threaded thereon will serve to secure said bolts in position and prevent the usual sliding motion of the rim relative to the plates. This will keep the rim 5 in proper spaced relation from the rim 4 and allow the wheel to be run at any speed as before. It will be obvious that when this is done, the pneumatic cushion effect will be entirely destroyed and the shocks of traffic will be transmitted from the tire through the plates 14 to the rim. It will be possible, however, to use the wheel without damage thereto until the leak in the air space may be repaired.

When the detachable rim shown in Fig. 2 is used, my invention may be applied to a wheel now in common use. I may, however, use the special rim shown in Fig. 3, and in such case a special wheel for the use of my invention will be required. This will allow a saving of material and in expense of construction where the wheel is originally designed to use my improved tire.

I have thus shown a tire which is strong of construction and which has all the advantages of the ordinary pneumatic tire, but which is cheap and durable in construction and which will not readily be damaged or broken.

Having thus described my invention, the further objects and advantages of which will be clear without further description, what I claim as new and desire to protect by Letters Patent is:

1. A pneumatic tire comprising an inner rigid rim adapted to be detachably secured to the rim of a vehicle wheel, a solid outer rim of rigid material spaced from said inner rim, annular resilient diaphragms connecting said rims in air tight relation, a rigid plate secured to each side of said inner rim outside said diaphragm and slidable on said outer rim and rods passing through said outer rim and said plates to retain said plates slidably on said outer rim.

2. A pneumatic tire comprising an inner rigid rim adapted to be detachably secured to the rim of a vehicle wheel, a solid outer rim spaced from said removable rim, means connecting said rims to preserve an air-tight connection between them, and rigid plates secured to said inner rim and slidably secured to said outer rim, said plates being bowed transversely to provide space for expansion of said air-tight connecting means.

3. A pneumatic tire comprising an inner rigid rim, an outer rim spaced from said inner rim, resilient diaphragms connecting said rims, plates secured rigidly to said inner rim and slidable on said outer rim to protect said diaphragms and means to secure said plates rigidly to said outer rim also, when desired.

In testimony whereof I hereunto affix my signature, this the 1st day of April, A. D. 1919.

CHAS. DROUET.